United States Patent [19]

Jäckel

[11] Patent Number: 5,146,811
[45] Date of Patent: Sep. 15, 1992

[54] VIBRATION DAMPING APPARATUS

[75] Inventor: Johann Jäckel, Baden-Baden, Fed. Rep. of Germany

[73] Assignee: Luk Lamellen und Kupplungsbau GmbH, Bühl, Fed. Rep. of Germany

[21] Appl. No.: 794,872

[22] Filed: Nov. 19, 1991

[30] Foreign Application Priority Data

Dec. 24, 1990 [DE] Fed. Rep. of Germany ....... 4041747

[51] Int. Cl.$^5$ ............................................. F16F 15/10
[52] U.S. Cl. .................. 74/574; 192/106.2; 464/64; 464/66
[58] Field of Search .......... 192/106.1, 106.2; 464/64, 66, 62; 74/572, 574

[56] References Cited

U.S. PATENT DOCUMENTS

| 4,027,757 | 6/1977 | Radke et al. | 464/64 X |
|---|---|---|---|
| 4,674,991 | 6/1987 | Tojima et al. | 192/106.2 X |
| 4,723,463 | 2/1988 | Reik | 74/574 |
| 4,777,843 | 10/1988 | Bopp | 74/574 |
| 4,782,936 | 11/1988 | Bopp | 74/574 X |
| 4,788,884 | 12/1988 | Reik et al. | 192/106.2 X |
| 4,790,419 | 12/1988 | Loizeau | 192/106.2 X |
| 4,790,792 | 12/1988 | Bopp | 464/66 |
| 4,874,074 | 10/1989 | Damon et al. | 192/106.2 |
| 4,889,009 | 12/1989 | Friedmann et al. | 74/572 X |
| 5,030,167 | 7/1991 | Jäckel | 464/67 |

FOREIGN PATENT DOCUMENTS 3909892 10/1989 Fed. Rep. of Germany .

Primary Examiner—Nicholas Whitelaw
Attorney, Agent, or Firm—Peter K. Kontler

[57] ABSTRACT

Apparatus for damping vibrations between the crankshaft of the engine and the clutch plate of the friction clutch of a motor vehicle has a first flywheel which is driven by the crankshaft, a second flywheel which is rotatable relative to the first flywheel and can rotate the clutch plate, and a torque transmitting unit between the flywheels. The unit employs one or more dampers in an annular chamber of the first flywheel and a slip clutch on the other flywheel. The output element of the damper or dampers is a flange-like device which constitutes a diaphragm spring and transmits torque to an axially stressed resilient disc which forms part of the slip clutch. The disc is riveted to the second flywheel and is adjacent an axially stressed resilient diaphragm seal which engages the first flywheel to seal the chamber from the atmosphere.

25 Claims, 2 Drawing Sheets

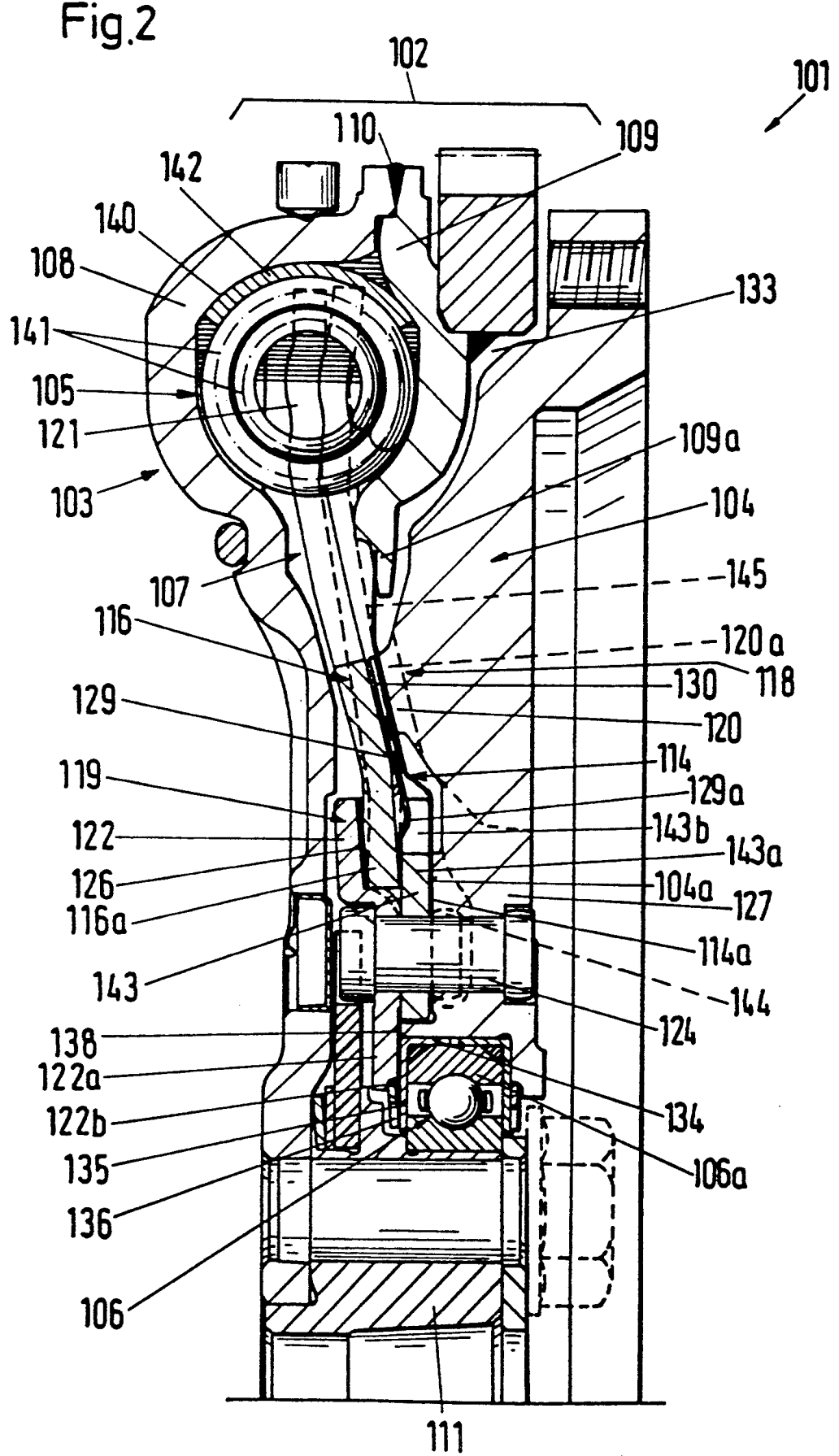

VIBRATION DAMPING APPARATUS

BACKGROUND OF THE INVENTION

The invention relates to improvements in apparatus for damping vibrations between the driving and driven (primary and secondary) components of power trains. More particularly, the invention relates to improvements in apparatus which can be utilized to damp vibrations between the rotary output elements of engines and rotary input elements of transmissions in motor vehicles.

Vibration damping apparatus of the above outlined character normally comprise a first or primary flywheel which is connectable to the output element (e.g., a crankshaft) of an internal combustion engine, a second or secondary flywheel which is coaxial with and is rotatable relative to the first flywheel and is connectable to the rotary input element of a variable speed transmission, and means for transmitting torque between the flywheels. Certain presently preferred torque transmitting means include a torsionally elastic damper in series with a slip clutch which employs a flange-like torque transmitting device. The flange-like device is stressed in the axial direction of the flywheels and transmits torque from the damper to the slip clutch.

It is also known to provide one of the flywheels with a chamber which is at least partially filled with a viscous fluid and serves to receive a portion of the torque transmitting means. The means for stressing the flange-like torque transmitting device is carried by the other flywheel, and the other flywheel can transmit torque to the input element of the transmission by way of an engageable friction clutch. Such design ensures that friction heat which is generated during engagement or disengagement of the friction clutch is less likely to affect the condition of the confined viscous fluid and the operation of those parts of the torque transmitting means which are confined in the aforementioned chamber of the one flywheel.

Vibration damping apparatus of the afore-described character are described, for example, in German patent application No. 39 09 892 of Johann Jackel (published Oct. 12, 1989). Such apparatus exhibit a number of desirable advantages. However, the cost of presently known vibration damping apparatus is relatively high, primarily (or to a large extent) because the assembly of their parts constitutes a complex and time-consuming procedure.

OBJECTS OF THE INVENTION

An object of the invention is to provide a vibration damping apparatus which is simpler and more compact than, but at least as reliable as, heretofore known apparatus.

Another object of the invention is to provide a vibration damping apparatus whose useful life is longer than that of conventional apparatus.

A further object of the invention is to provide a vibration damping apparatus which can be utilized with particular advantage in the power trains of motor vehicles and can be assembled in a simple and time-saving manner.

An additional object of the invention is to provide a novel and improved method of assembling certain constituents of the above outlined vibration damping apparatus.

Still another object of the invention is to provide the vibration damping apparatus with novel and improved torque transmitting means between its primary and secondary components, particularly between a first flywheel which receives torque from an engine and a second flywheel which can transmit torque to a transmission, preferably by way of a friction clutch or the like.

A further object of the invention is to provide the vibration damping apparatus with novel and improved means for reliably sealing the chamber for the supply of viscous fluid.

Another object of the invention is to provide the vibration damping apparatus with novel and improved means for properly stressing and mounting the device which transmits torque between the damper or dampers and the slip clutch(es) of the means for transmitting torque between the primary and secondary components of the apparatus.

An additional object of the invention is to provide a novel and improved connection between the slip clutch(es) and the secondary component of the above outlined vibration damping apparatus.

A further object of the invention is to provide a power train which embodies the above outlined vibration damping apparatus.

Still another object of the invention is to provide a vehicle which embodies the above outlined vibration damping apparatus.

An additional object of the invention is to provide a vibration damping apparatus which occupies a minimal amount of space between the output element of an engine and the input element of a variable speed transmission in a motor vehicle.

Another object of the invention is to provide the above outlined apparatus with novel and improved means for preventing overheating of certain sensitive constituents, particularly of the primary component and of the means for transmitting torque between the primary and secondary components.

A further object of the invention is to provide an apparatus which constitutes an improvement over and a further development of apparatus of the type disclosed in commonly owned U.S. Pat. No. 5,030,167 granted Jul. 9, 1991 to Jäckel for "Apparatus for damping torsional vibrations".

SUMMARY OF THE INVENTION

The invention is embodied in an apparatus for damping vibrations in a power train between an engine and a transmission in a vehicle. The improved apparatus comprises at least two components which are rotatable relative to each other about a common axis and include a first component connectable with the engine (e.g., with the crankshaft of an internal combustion engine) and a second component which is connectable with the transmission (e.g., with the input shaft of a variable speed transmission), and means for transmitting torque between the first and second components. The torque transmitting means includes at least one torsionally elastic damper and a slip clutch in series with the damper. The slip clutch comprises a device which resembles a diaphragm spring and serves for transmission of torque between the damper and the slip clutch, means for stressing the device in the axial direction of the first and second components including two radially offset abutments which flank the device and are rotatable with one of the components. The other component has a preferably annular chamber which can accommodate the damper and/or the slip clutch and is at least partially filled with a viscous fluid (e.g., an oil or a paste). The chamber includes a sealed radially outermost portion and a radially inner portion, and the device has a radially outer portion. The torque transmitting means further comprises a diaphragm type seal for the radially inner portion of the chamber and a torque transmitting disc. The disc and the seal are interposed between the one component and the radially outer portion of the device.

The two components preferably constitute the flywheels of a composite flywheel.

It is presently preferred to employ a diaphragm seal and/or a disc which is resilient in the axial direction of the two components. The seal is or can be axially stressed between the disc and the one component. A friction lining (e.g., a friction ring) can be interposed between the device and the radially outer portion of the disc. The seal can extend radially outwardly beyond the disc.

The apparatus can further comprise at least one antifriction bearing between the first and second components, and one of the two abutments can be provided with means for maintaining the at least one bearing in a predetermined position as seen in the axial direction of the first and second components. Such maintaining means can comprise an annular disc.

The torque transmitting means can further comprise means (e.g., one or more rivets) for connecting the seal and the disc to the one component. Such rivet or rivets can be used to connect the aforementioned annular disc (maintaining means), the radially inner portion of the device, the seal and the disc to the one component.

The at least one antifriction bearing preferably comprises a first race, a second race and at least one annulus of spheres, barrels or other suitable rolling elements between the two races. The apparatus can further comprise an enclosure which confines one of the races and has portions extending substantially radially of the two components and overlying the other race, and an energy storing member (e.g., a diaphragm spring) which reacts against the disc and bears against one portion of the enclosure. The one race is preferably an outer race which surrounds the other race of the at least one antifriction bearing.

The disc and/or the seal can extend radially inwardly beyond the radially inner portion of the device and radially inwardly beyond the aforementioned maintaining means of the one abutment.

The torque transmitting means can further comprise means for coupling the disc to the seal. Such coupling means can comprise at least one male coupling member extending substantially in the axial direction of the two components, and at least one female coupling member having a socket for the at least one male coupling member. One of the male and female coupling members is provided on the disc, and the other of the male and female coupling members is provided on the seal.

The one abutment can comprise first and second disc-shaped portions which flank the radially inner portion of the device. The torque transmitting means of such apparatus can further comprise means for connecting the two disc-shaped portions of the one abutment to each other. These disc-shaped portions of the one abutment are or can be axially offset relative to the other abutment so that the device is stressed axially of the two components between the two disc-shaped portions and the other abutment. The torque transmitting means of such apparatus can further comprise means for axially movably but non-rotatably coupling the disc to one of the disc-shaped portions, and such coupling means can comprise at least one male coupling member extending substantially axially of the two components and at least one female coupling member having a socket for the at least one male coupling member. One of these male and female coupling members is provided on the disc, and the other of the male and female coupling members is provided on the one disc-shaped portion of the one abutment.

One of the two disc-shaped portions can include means (such as the respective coupling member or members) for centering the device.

The seal can extend radially beyond one of the two disc-shaped portions which form part of the one abutment and is preferably disposed between the one component and the one disc-shaped portion.

The novel features which are considered as characteristic of the invention are set forth in particular in the appended claims. The improved vibration damping apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 2 is a similar fragmentary axial sectional view of a modified vibration damping apparatus.

DESCRIPTION OF PREFERRED EMBODIMENTS

Figure 1:
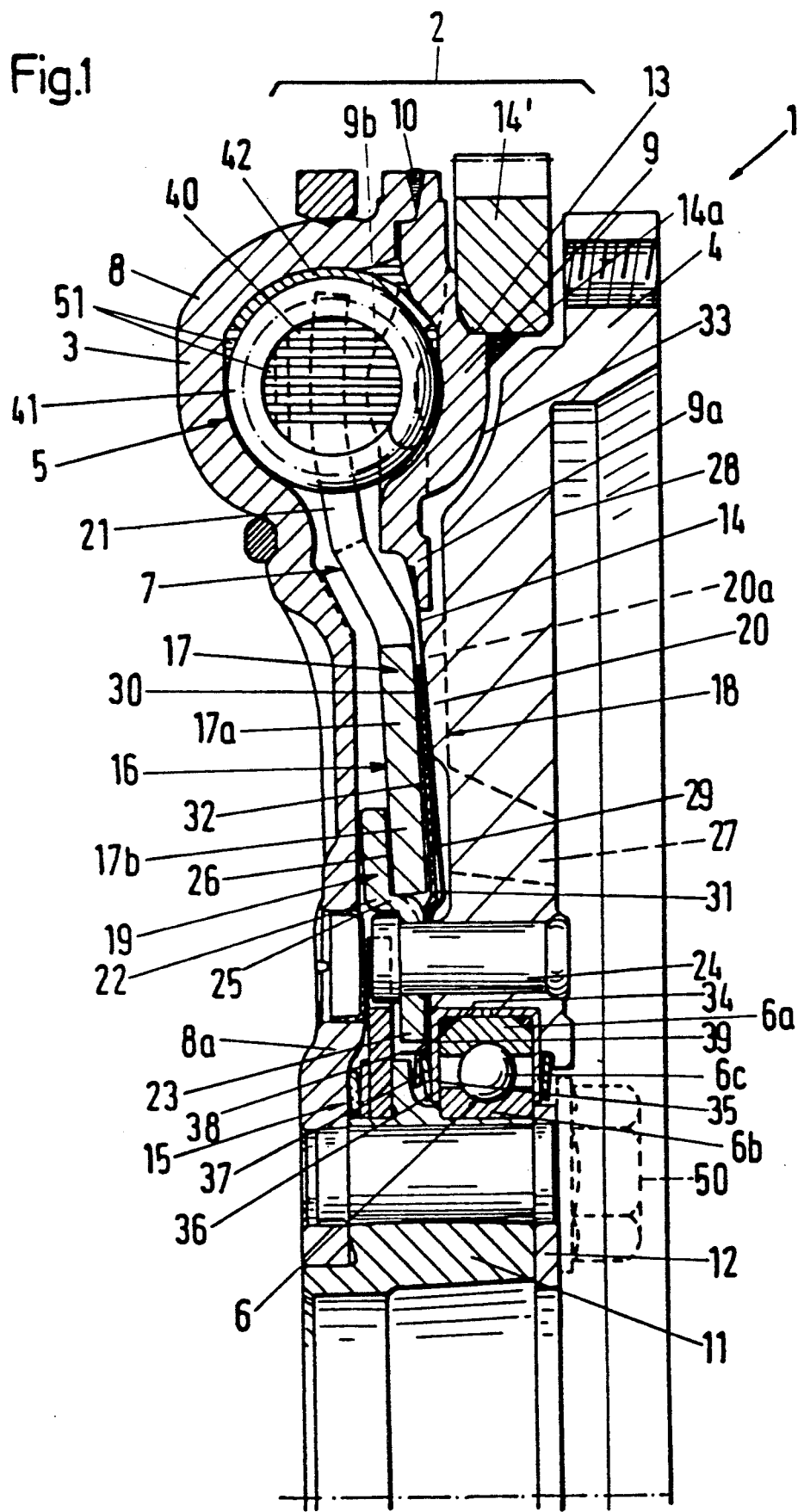
FIG. 1 is a fragmentary axial sectional view of a vibration damping apparatus which embodies one form of the present invention.

Referring first to FIG. 1, there is shown an apparatus 1 which can be utilized in the power train of a motor vehicle to damp vibrations between the output element (e.g., a crankshaft) of an internal combustion engine and the input element (e.g., a shaft) of a variable speed transmission in the vehicle. The arrangement is preferably such that an engageable friction clutch is interposed between the apparatus of FIG. 1 and the input shaft of the transmission. Reference may be had, for example, to commonly owned U.S. Pat. No. 4,723,463 granted Feb. 9, 1988 to Reik et al. for "Assembly for taking up and compensating for torque-induced shocks" which shows an engine, the output element of the engine, a variable speed transmission and its input element, as well as a friction clutch with a clutch plate mounted on the input element of the transmission.

The vibration damping apparatus 1 of FIG. 1 comprises a composite flywheel 2 which has a plurality of coaxial rotary components. FIG. 1 shows two components 3, 4 each of which can be said to constitute a flywheel. The component 3 is connectable to the output element of the engine by one or more screws, bolts or other suitable fasteners (one shown by broken lines, as at 50), and the component 4 is connectable to the cover or housing of the friction clutch. As mentioned above, the clutch plate of the friction clutch can transmit torque to the input element of the variable speed transmission.

The apparatus 1 further comprises an assembly or means for transmission of torque between the components 3, 4 of the composite flywheel 2, and such torque transmitting means comprises at least one torsionally elastic damper 5 (FIG. 1 shows a single damper) and at least one slip clutch 18 (FIG. 1 shows a single slip clutch) in series with the damper 5. The damper 5 is designed to permit but to yieldably oppose a certain angular displacement of the component 4 relative to the component 3 and/or vice versa. An antifriction roller bearing 6 is installed between the radially inner portions of the components 3 and 4.

The radially outer portion of the component 3 constitutes a housing including two sheet-metal sections or walls 8, 9 and defining an annular chamber 7 which is at least partially filled with a viscous fluid 51, e.g., a lubricant having the consistency of oil or that of a paste or grease). The damper 5 is installed in the radially outermost portion or compartment 40 of the chamber 7. Such radially outermost portion of the chamber 7 is sealed by a welded seam 10 between the abutting faces of the sections or walls 8 and 9. Thus, the seam 10 performs the dual function of fixedly connecting the sections 8, 9 to each other and of sealing the compartment 40 from the surrounding atmosphere.

The section 8 of the housing for the chamber 7 is adjacent the engine when the apparatus 1 is installed in the power train between the engine and the transmission of a vehicle, and this section includes a centrally disposed protuberance 11 extending toward the transmission and being surrounded by the inner race 6b of the antifriction bearing 6. The outer race 6a surrounds the inner race 6b of the bearing 6, and such bearing further comprises at least one annulus (only one shown) of spherical, barrel-shaped, needle-shaped or otherwise configurated rolling elements. FIG. 1 shows a single spherical rolling element 6c. A washer-like retainer 12 is secured to the protuberance 11 and overlies the radially inner portion of the inner race 6b to prevent any rightward axial movements of the bearing 6. The retainer 12 can be secured to the protuberance 11 by the aforementioned fasteners 50 which secure the component 3 to the output element of the engine.

The section 9 of the housing for the chamber 7 of the component 3 has an external ring-shaped shoulder 13 which is surrounded by a ring-shaped starter gear 14'. This gear is welded or otherwise fixedly secured to the section 9, as at 14a.

The radially inner portion of the annular chamber 7 between the sections 8, 9 of the housing which forms part of the component 3 is sealed by a diaphragm type seal 14 (hereinafter called seal or diaphragm seal) which extends radially outwardly toward and is overlapped by and is in sealing engagement with the radially innermost portion 9a of the section 9. The seal 14 is adjacent the respective side of the component 4 and extends radially inwardly all the way to the antifriction bearing 6.

The slip clutch 18 is also installed in the chamber 7 of the component 3, the same as a friction generating device 15 which operates between the components 3, 4 and is disposed between the radially inner portion 8a of the section 8 and the antifriction bearing 6. The illustrated friction generating device 15 surrounds the protuberance 11 which latter is of one piece with or is rigidly affixed to the radially inner portion 8a of the section 8.

The torque transmitting output element of the damper 5 is a flange-like metallic device 16 which resembles a diaphragm spring and has a radially inner or main portion 17 constituting the input element of the slip clutch 18. The latter is designed to determine the maximum torque which can be transmitted between the components 3, 4 of the composite flywheel 2, i.e., the maximum torque which can be transmitted between the output element of the engine and the input element of the variable speed transmission when the friction clutch between the component 4 and the input element of the transmission is engaged. The connection between the slip clutch 18 and the component 4 is a force-locking connection.

The device 16 is installed between two abutments 19, 20 which are offset relative to each other in the radial direction of the composite flywheel 2. Thus, the abutment 19 is nearer to and the abutment 20 is more distant from the common axis of the components 3, 4 and the flywheel 6. The abutments 19, 20 cooperate to stress the device 16 in the axial direction of the composite flywheel 2. Thus, when properly installed between the components 3 and 4, the diaphragm spring like device 16 is flat or exhibits a less pronounced conicity than in unstressed condition prior to its mounting in the vibration damping apparatus 1.

The device 16 comprises the aforementioned radially inner or main portion 17 and a set of substantially radially outwardly extending arms or prongs 21 which alternate with the energy storing elements 41 (preferably in the form of coil springs) of the damper 5 in the compartment 40 of the annular chamber 7. When the vibration damping apparatus 1 is properly assembled, the radially outer part 17a of the main portion 17 bears against the abutment 20 (which forms part of the component 4), and the radially inner part 17b of the main portion 17 is located between the abutment 19 and a diaphragm-like disc 29 of the slip clutch 18. The radially inner part 17b of the main portion 17 of the device 16 then reacts against the abutment 19. The abutment 19 includes a disc-shaped radially outer portion 22 which is actually engaged by the radially inner part 17b of the main portion 17, and a radially inner portion 23 which is secured to the component 4 by a set of connecting means in the form of rivets 24 (only one shown in FIG. 1). The radially inner portion 23 of the abutment 19 can be said to constitute or resemble an annular disc and serves as a means for maintaining the antifriction bearing 6 in a predetermined axial position relative to the protuberance 11 of the component 3. This bearing extends into a ring-shaped recess in the radially inner portion of the component 4. The rivets 24 serve as a means for connecting the component 4 with the radially inner portion 23 of the abutment 19, with the disc 29 of the slip clutch 18 and with the diaphragm seal 14 for the radially inner portion of the annular chamber 7. The portions 22, 23 of the abutment 19 are axially offset relative to each other and are integral with a substantially S-shaped intermediate portion 25 which is adjacent the internal surface of main portion 17 of the device 16. The portion 25 can be said to constitute a means for centering the device 16 between the section 8 of the component 3 and the component 4. A friction ring 26 is installed between the radially inner part 17b of the main portion 17 and the radially outer portion 22 of the abutment 19.

As mentioned above, the other abutment 20 for the device 16 forms part of the component 4 and is located radially outwardly of the abutment 19. It is presently preferred to provide the component 4 with an abutment 20 which consists of two or more arcuate sections or portions together forming a composite ring-shaped projection and alternating with substantially radially extending passages 20a confronting the right-hand side of the diaphragm seal 14. The purpose of the passages 20a is to permit circulation of cool atmospheric air which withdraws heat from the component 4 and thus prevents overheating of the seal 14 and of the contents (including 5, 15, 18, 51) of the annular chamber 7. The component 4 is heated during engagement or disengagement of the friction clutch, namely when the friction surface 28 at the right-hand side of the component 4 slides relative to the adjacent friction lining of a clutch plate forming part of the friction clutch and having a hub mounted on and serving to rotate the input element of the variable speed transmission when the friction clutch is engaged.

The passages 20a between the sections or portions of the abutment 20 communicate with substantially axially parallel holes or ports 27 which are provided in the component 4 radially inwardly of the friction surface 28, as well as with a clearance or gap 33 between the outer side of the section 9 and the adjacent radially outer portion of the component 4.

The slip clutch 18 further comprises a friction lining 30 which is installed between the radially outer part 17a of main portion 17 of the device 16 and the adjacent radially outermost portion of the diaphragm like disc 29. The device 16 can turn relative to the component 4 and/or vice versa when the main portion 17 is compelled to turn relative to the friction lining 30 (if the latter is affixed (e.g., bonded) to the disc 29) or when the disc 29 can turn relative to the lining 30 (if the latter is bonded to the main portion 17 of the device 16).

As already mentioned hereinabove, the radially inner portions of the disc 29 and seal 14 are non-rotatably connected to the component 4 by rivets 24. To this end, the disc 29 and the seal 14 extend radially inwardly beyond the main portion 17 of the device 16 and overlie the right-hand side of the radially inner portion 23 of the abutment 19.

The disc 29 and the diaphragm spring 14 are preferably made of spring steel and are preferably stressed during installation in the apparatus 1. An advantage of a springy disc 29 and of a springy seal 14 is that these parts do not undergo permanent deformation when the assembly of the apparatus 1 is completed. The radially outermost portion of the seal 14 bears against and thus sealingly engages the radially innermost portion 9a of the section 9. It is presently preferred to employ a seal 14 which is thinner than the disc 29. For example, the thickness of the seal 14 can be between 0.15 and 0.25 mm, and the thickness of the disc 29 can be between 0.4 and 0.7 mm. The relatively thin seal 14 is readily deformable in the axial direction of the composite flywheel 2; this ensures that the radially inner portion 9a of the section 9 and the radially outermost portion of the seal 14 generate a relatively small amount of friction when the component 3 (i.e., the section 9) is caused to turn relative to the component 4 (i.e., the seal 14) and/or vice versa.

The disc 29 and the friction lining 30 transmit at least a certain amount of torque, namely the torque between the radially outer part 17a of the main portion 17 of the device 16 and the component 4 of the composite flywheel 2. The disc 29 shields the seal 14 from deformation by the axial force which is transmitted by the main portion 17 of the device 16. The seal 14 is located and can be clamped between the abutment 20 of the component 4 and the disc 29. The rivets 24 (which non-rotatably connect the disc 29 with the component 4) ensure that the seal 14 need not participate in transmission of torque so that the seal is not subjected to any torsional or like deforming stresses which could affect its sealing action. The feature that the seal 14 is shielded from torsional and other non-axial stresses ensures the establishment of a highly satisfactory sealing action between the radially outermost portion of the seal 14 and the radially innermost portion 9a of the section 9.

The inclination of that portion of the disc 29 which is adjacent the right-hand side of the main portion 17 of the device 16 is different from the inclination of the adjacent portion of the seal 14. This results in the establishment of a narrow wedge-like clearance or space 31 which narrows radially outwardly. Moreover, the left-hand side of the disc 29 is slightly spaced apart from the main portion 17 of the device 16 so that these parts also define a wedge-like clearance or gap 32. The aforementioned clearance or gap 33 (which communicates with the passages 20a) is open to the atmosphere in the region of the starter gear 14 so that streams of cooling air can circulate from the ports 27, through the passages 20a and through the clearance 33 when the component 4 is in rotary motion. At such time, the component 4 draws cool atmospheric air into its ports 27. The ports 27, the passages 20a and the clearances 31, 32, 33 ensure that the annular chamber 7 and the viscous fluid 51 therein are not affected by heat which is generated at the friction surface 28 of the component 4 during engagement or disengagement of the friction clutch, i.e., when the surface 28 moves relative to the adjacent friction lining of the clutch plate forming part of the friction clutch. The friction lining 30 (e.g., a friction ring) is preferably made of a material which is a poor conductor of heat; this also contributes to satisfactory thermal insulation of the component 3 from the component 4.

Prior to being installed between the device 16 and the component 4, the radially outer portions of the seal 14 and disc 29 constitute hollow conical frusta. At such time, the radially outermost portions of the parts 14 and 29 are located to the right of the positions which are shown in FIG. 1. Deformation of the seal 14 and disc 29 take place in response to the application of rivets 24. The same holds true for the resilient diaphragm spring like device 16.

The outer race 6a of the antifriction bearing 6 is confined in a two-piece enclosure 34 which has installed in the aforementioned annular recess of the component 4 and includes portions 35 which overlie the respective end faces of the inner race 6b radially outwardly of the retainer 12. The enclosure 34 serves as a means for thermally insulating the bearing 6 from the component 4. Energy storing members in the form of diaphragm springs 36 are provided to bias the portions 35 of the enclosure 34 against the respective end faces of the inner race 6b. This ensures that the lubricant for the rolling elements 6c is confined in the annular space between the races 6a and 6b.

The radially innermost portion 37 of the disc 29 extends radially inwardly beyond the portions 22, 25, 23 of the abutment 19 and overlaps the left-hand diaphragm spring 36; the left-hand diaphragm spring 36 reacts against the portion 37 and bears against the respective radially inwardly extending portion 35 of the enclosure 34.

The radially innermost portion of the seal 14 also extends radially inwardly of the abutment 19 and has axially parallel male coupling members in the form of prongs 38 which are received in complementary sockets 39 of the radially innermost portion 37 of the disc 29. The portion 37 can be said to constitute a female coupling member which cooperates with the male coupling members or prongs 38 to ensure that the seal 14 and the disc 29 cannot turn relative to each other. The radially innermost portion of the seal 14 is preferably provided with radially extending slots which alternate with the male coupling members 38, and such male coupling members are simply bent out of the general plane of the seal 14 so that they can enter the adjacent sockets 39 when the radially innermost portions of the seal 14 and disc 29 are placed next to each other preparatory to application of the rivets 24. The just described coupling between the radially innermost portions of the seal 14 and disc 29 constitutes a reliable form-locking connection which facilitates accurate positioning of these parts relative to each other as well as relative to the abutment 19, device 16 and abutment 20 of the component 4 prior to application of the rivets 24.

The radially outermost portion or compartment 40 of the chamber 7 is subdivided into arcuate portions, one for each of the several arcuate energy storing coil springs 41 of the damper 5. Subdivision of the compartment 40 into arcuate portions for discrete coil springs 41 can be effected by providing the sections 8, 9 with inwardly extending depressed portions (one shown at 9b) which provide room for the radially outwardly extending legs 21 of the device 16. The projections (including that shown at 9a) and the arms 21 alternate with the springs 41 so that each such spring is caused to store energy when the sections 8, 9 of the component 3 are caused to turn relative to the device 16 and/or vice versa. The manner of stressing the springs of a damper in an annular chamber of one flywheel of a composite flywheel in a vibration damping apparatus for use in the power train between the engine and the transmission of a motor vehicle is fully described and shown in numerous United States and foreign patents and in numerous United States and foreign patent applications of the assignee of the present application.

The compartment 40 of the annular chamber 7 contains arcuate shrouds or shields 42 which are installed between the radially outermost portions of the springs 41 and the adjacent portions of internal surfaces of the sections 8, 9. The hardness of the material of the shrouds 42 (each arcuate portion of the compartment 40 can contain a discrete shroud) preferably exceeds the hardness of the material of the sections 8, 9. The purpose of such shrouds is to shield the sections 8 and 9 from extensive wear when the apparatus 1 is in actual use, i.e., when the component 3 is rotated and the springs 41 tend to move radially outwardly under the action of centrifugal force. The quantity of viscous fluid 51 in the chamber 7 is selected in such a way that at least a portion of each spring 41 is contacted by viscous fluid when the component 3 is caused to rotate so that the viscous fluid is forced into the radially outermost portion 40 of the chamber 7 under the action of centrifugal force.

The housing including the sections 8, 9 and the springs 41 can be constructed and mounted, and the damper 5 and certain other units of the apparatus 1 can operate, in a manner as disclosed in the aforementioned published German patent application No. 39 09 892.

An important advantage of the improved vibration damping apparatus is that the radially inner portion of the chamber 7 can be sealed by a very thin diaphragm seal 14 which is not subjected to the deforming action of the diaphragm spring like or flange like torque transmitting device 16. The seal 14 is acted upon by the torque transmitting disc 29 which causes it to bear upon the radially innermost portion 9a of the section 9 with a force that is necessary to confine the viscous fluid 51 in the chamber 7. The disc 29 transmits torque between the device 16 and the component 4, i.e., such torque need not be transmitted by the seal 14 so that the latter is not subjected to any torsional or other stresses which could affect its useful life and/or its sealing action at 9a.

The device 16 is axially stressed in such a way that it bears against the ring-shaped friction lining 26 rather than against the median portion of the disc 29 (note the clearance or gap 32). Thus, though the disc 29 receives torque from the device 16 via preferably ring-shaped friction lining 30, it need not take up the axial stresses which are applied by the radially inner portion 17b of the main portion 17. This contributes to compactness of the vibration damping apparatus because the seal 14 as well as the disc 29 can be made of thin or extremely thin spring steel sheet stock or a similar resilient material.

Though it is possible, to modify the design of the improved vibration damping apparatus by mounting the abutment 19 on the component 3, it is presently preferred to provide the chamber 7 in that component (3) of the composite flywheel 2 which is connectable to the output element of the engine.

The device 16 can be modified in a number of ways without departing from the spirit of the invention. For example, the recesses between the arms 21 (each such recess receives one of the coil springs 41) can be replaced by windows, i.e., the arms 21 can constitute partitions between a set of neighboring windows each of which is dimensioned to receive a coil spring or another suitable energy storing element of the damper 5 or an analogous damper. The main portion 17 of the device 16 preferably constitutes a one-piece washer-like (ring-shaped body).

The component 3 constitutes the input element of the damper 5, i.e., the inwardly extending portions (see the portion 9b) of its walls 8, 9 can directly engage and stress the springs 41 of the damper. The device 16 constitutes the output element of the damper 5 and connects the latter in series with the slip clutch 18 including the disc 29. The slip clutch 18 established a force-locking connection between the device 16 and the component 4.

The utilization of a resilient disc 29 and of a resilient seal 14 constitutes an additional advantageous feature of the improved apparatus. Thus, by utilizing parts 14 and 29 which are resilient in the axial direction of the components 3 and 4, one ensures that neither of these parts undergoes permanent deformation during assembly of the vibration damping apparatus 1 as well as that such parts remain resilient when the apparatus is in actual use. Permanent deformation of the seal 14 would affect its sealing action. This seal is installed between the disc 29 and the component 4 and is stressed in the axial direction to ensure the establishment of reliable and long-lasting sealing engagement with the radially innermost portion 9a of the section 9 of the housing for the chamber 7. By coupling the seal 14 for rotation with the disc 29, one ensures that the seal 14 need not take up any torsional or other stresses which would adversely affect its shape and hence its sealing action. More specifically, the seal 14 is subjected only to axial stresses but is not acted upon in the circumferential direction of the components 3 and 4.

The purpose of the friction lining 30 is to ensure the establishment of an optimal moment of friction between the device 16 and the component 4, i.e., to ensure highly predictable operation of the slip clutch 18. The lining 30 can constitute a one-piece ring or it can be assembled of several discrete sections.

The feature that the seal 14 extends radially outwardly beyond the disc 29 is desirable and advantageous because this ensures that the magnitude of friction between the radially outermost portion of the seal 14 and the radially innermost portion 9a of the section 9 is within an optimal range, i.e., that the wear upon the seal 14 during angular movement relative to the section 9 and/or vice versa is within acceptable limits.

The rivets 24 are preferably installed close to the outer race 6a of the antifriction bearing 6. As mentioned above, these rivets perform a number of important functions, namely of connecting the component 4 with the abutment 19, with the disc 29 and with the seal 14. At the same time, the rivets 24 enable the abutment 19 to cooperate with the abutment 20 in maintaining the device 16 in axially stressed condition as well as of axially stressing the disc 29 and the seal 14, of ensuring the establishment of optimal frictional engagement between the friction lining 30 and the device 16 (or disc 29), and the establishment of optimal frictional engagement between the seal 14 and the section 9.

FIG. 2 shows a portion of a modified vibration damping apparatus 101. All such constituents of the apparatus 101 which are identical with or clearly analogous to corresponding constituents of the apparatus 1 of FIG. 1 are denoted by similar reference characters plus 100. The radially inner portion 116a of the main portion of the diaphragm spring like torque transmitting device 116 is disposed between the disc-shaped radially outer portion 122 of the abutment 119 and the disc-shaped radially outer portion 143a of a washer 143 which can be said to constitute a separately produced part of the composite abutment 119. The means for fixedly connecting the washer 143 to the other (main) part of the abutment 119 includes rivets 144 which preferably form an annulus and alternate with rivets 124 for connection of the abutment 119 to the second component 104 of the composite flywheel 102. The rivets 144 render it possible to secure the washer 143 to the main part of the composite abutment 119 and to simultaneously assemble the disc-shaped portions 122, 143a of such composite abutment with the device 116 to thus obtain a preassembled unit which can be more readily assembled with the component 104 before the latter is assembled with the component 103 and bearing 106.

When the making of the subassembly is completed, i.e., when the rivets 144 connect the washer 143 with the main portion of the composite abutment 119 and the radially inner portion 116a of the device 116 is located between the disc-shaped portions 122 and 143a, that part of the device 116 which is located radially outwardly of the disc-shaped portions 122, 143a assumes a shape which is shown by broken lines, as at 145. At such time, the device 116 is maintained in partly stressed condition. Such initial stressing of the device 116 (during making of the subassembly including the composite abutment 119 and the device 116) ensures that the device 116 need not undergo extensive additional axial stressing during assembly of the component 103, namely during making of the welded seam 110 which connects the housing sections 108, 109 to each other and simultaneously seals the radially outermost portion or compartment 140 of the annular chamber 107. In other words, the section 109 need not subject the device 116 to a pronounced axial stress during attachment of the section 109 to the section 108 of the component 103. Initial stressing of the device 116 (i.e., while the device 116 assumes the shape 145 as a result of making of the subassembly including the composite abutment 119 and the device 116) suffices to ensure convenient introduction of the arms 121 into the compartment 140 of the chamber 107 so that the arms 121 alternate with the coil springs 141 of the torsionally elastic damper 105 in the chamber 107. The radially outer portions of the springs 141 in the compartment 140 are adjacent arcuate shrouds 142, at least one in each arcuate portion of the compartment 140. The arms 121 of the device 116 facilitate proper installation of the springs 141 and/or shrouds 142 in the respective arcuate portions of the compartment 140. This renders it possible to expedite the assembly of the vibration damping apparatus 101.

The radially innermost portion 122a of the composite abutment 119 serves to maintain the bearing 106 in a predetermined axial position relative to the central axial protuberance 111 of the component 103. This radially innermost portion 122a bears against the adjacent portion 135 of the enclosure 134 for the outer race 106a of the bearing 106. The latter is but need not be identical with or similar to the antifriction bearing 6 of FIG. 1. The radially innermost portion 122a of the composite abutment 119 can carry the left-hand diaphragm spring 136 which bears against the adjacent radially inwardly extending portion 135 of the enclosure 134. To this end, the internal surface of the portion 122a is provided with an annular shoulder 122b for the radially outermost portion of the adjacent diaphragm spring 136. A thin washer 138 is provided at the left-hand side of the innermost portion 122a to overlie the radially outermost portion of the diaphragm spring 136 so that the latter is compelled to contact the shoulder 122b and is properly centered and otherwise positioned prior to attachment of the composite abutment 119 to the component 104, i.e., prior to application of the rivets 124. This simplifies the assembly of the vibration damping apparatus 101.

The washer 138 can constitute the radially innermost portion of a blank (made of thin spring steel sheet stock) which is converted into the diaphragm seal 114 for the radially inner portion of the chamber 107. The radially outermost portion of the washer 138 is clamped between the washer 143 and the radially innermost portion 122a of the composite abutment 119.

The radially outermost port of the diaphragm seal 114 bears against the radially innermost portion 109a of the substantially radially extending housing section 109. The radially inner portion 114a of the seal 114 is clamped between the adjacent radially extending surface 104a of the component 104 and the washer 143 of the composite abutment 119.

The disc 129 is installed between the seal 114 and the device 116, and its radially innermost portion includes radially inwardly extending male coupling member 129a in the form of prongs, lugs or teeth which extend into radially extending sockets provided in the radially outermost portion or female coupling member 143b of the washer 143. The form-locking connection or coupling including the male coupling member 129a and the female coupling member 143b ensures that the disc 129 shares the angular movements of the composite abutment 119 but is movable axially of the washer 143. Such coupling further serves as a means for centering the disc 129 on the washer 143 of the composite abutment 119. The male coupling members 129a serve to transmit to the washer 143 (and hence to the composite abutment 119 and component 104) that portion of torque which is being transmitted by the disc 129.

A friction lining 126 is installed between the radially outermost portion 122 of the abutment 119 and the adjacent side of the device 116. A further friction lining 130 is disposed between the device 116 and the disc 129.

The shape of the disc 129 and seal 114 in the fully assembled vibration damping apparatus 101 departs, in unstressed condition. When the disc 129 and the seal at least slightly, from the shape which these parts assume 114 are unstressed or are not fully stressed, their portions between the abutment 120 of the component 104 and the device 116 (while the device 116 is free to assume the shape 145) are substantially or exactly parallel to the adjacent portion of the device 116.

The transfer of heat from the component 104 to the component 103 and its chamber 107 is reduced to an acceptable value by streams of air which are caused to enter the ports 127 of the component 104, thereupon flow through the radial passages 120a between the portions of the abutment 120, and leave the apparatus 101 through the clearance or gap 133.

An advantage of the subassembly which includes the composite abutment 119 (with its disc-shaped portion or washer 143), the rivets 144 and the device 116 is that the latter is subjected to some axial stressing prior to further assembly of the vibration damping apparatus 101. Thus, and as already explained hereinabove, the making of the welded seam 110 between the sections 108, 109 of the component 103 can be carried out without extensive additional stressing of the device 116 by the section 109. This simplifies the assembly of the component 103, i.e., the establishment of a rigid connection between the sections 108 and 109. In addition, the subassembly including the composite abutment 119, the rivets 144 and the device 116 facilitates rapid and predictable assembly of the damper 105, i.e., the installation of springs 141 and shroud 142 in the corresponding portions of the compartment 140, i.e., in the radially outermost portion of the annular chamber 107.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations in a power train between an engine and a transmission in a vehicle, comprising at least two components which are rotatable relative to each other about on axis and include a first component connectable with the engine and a second component connectable with the transmission; and means for transmitting torque between said components, including at least one torsionally elastic damper and a slip clutch in series with said at least one damper, said slip clutch comprising a diaphragm spring device for transmission of torque between said damper and said slip clutch, means for stressing said device in the axial direction of said components including two radially offset abutments flanking said device and rotatable with one of said components, the other of said components having an annular chamber which is at least partially filled with a viscous fluid and includes a sealed radially outermost portion and a radially inner portion, said device having a radially outer portion and said torque transmitting means further comprising a diaphragm seal for the radially inner portion of said chamber and a torque transmitting disc, said disc and said seal being interposed between said one component and the radially outer portion of said device.

2. The apparatus of claim 1, wherein said components are flywheels of a composite flywheel.

3. The apparatus of claim 1, wherein said seal is resilient in the axial direction of said components.

4. The apparatus of claim 1, wherein said disc is resilient in the axial direction of said components.

5. The apparatus of claim 1, wherein said seal is resilient in the axial direction of said components and is axially stressed between said disc and said one component.

6. The apparatus of claim 1, wherein said disc has a radially outer portion and said torque transmitting means further comprises a friction lining between said device and the radially outer portion of said disc.

7. The apparatus of claim 6, wherein said lining includes a friction ring.

8. The apparatus of claim 1, wherein said seal extends radially outwardly beyond said disc.

9. The apparatus of claim 1, further comprising an antifriction bearing between said components, one of said abutments including means for maintaining said bearing in a predetermined position in the axial direction of said components.

10. The apparatus of claim 9, wherein said means for maintaining includes an annular disc.

11. The apparatus of claim 1, wherein said torque transmitting means further comprises means for connecting said seal and said disc to said one component.

12. The apparatus of claim 1, wherein said device comprises a radially inner portion and one of said abutments includes a portion which is adjacent the radially inner portion of said device, said torque transmitting means further comprising means for connecting said portion of said one abutment, said seal and said disc to said one component.

13. The apparatus of claim 12, wherein said connecting means comprises at least one rivet.

14. The apparatus of claim 1, further comprising an antifriction bearing disposed between said components and having a first race and a second race, an enclosure confining one of said races and having portions extending substantially radially of said components and overlying the other of said races, and an energy storing member reacting against said disc and bearing against one portion of said enclosure.

15. The apparatus of claim 14, wherein said one race surrounds said other race.

16. The apparatus of claim 1, wherein said device includes a radially inner portion and one of said abutments includes a portion adjacent the radially inner portion of said device, said disc extending radially inwardly beyond said portion of said one abutment.

17. The apparatus of claim 1, wherein said device includes a radially inner portion and one of said abutments includes a portion adjacent the radially inner portion of said device, said seal extending radially inwardly beyond said portion of said one abutment.

18. The apparatus of claim 1, further comprising means for coupling said disc to said seal, said coupling means comprising at least one male coupling member extending in the axial direction of said components and at least one female coupling member having a socket for said male coupling member, one of said members being provided on said disc and the other of said members being provided on said seal.

19. The apparatus of claim 1, wherein said device includes a radially inner portion and one of said abutments includes a first disc-shaped portion and a second disc-shaped portion, said radially inner portion of said device being disposed between the disc-shaped portions of said one abutment.

20. The apparatus of claim 19, wherein said torque transmitting means further comprises means for connecting said disc-shaped portions to each other.

21. The apparatus of claim 19, wherein said disc-shaped portions are axially offset relative to the other of said abutments so that said device is stressed axially of said components between said disc-shaped portions and said other abutment.

22. The apparatus of claim 19, wherein said torque transmitting means further comprises means for axially movably but non-rotatably coupling said disc to one of said disc-shaped portions.

23. The apparatus of claim 22, wherein said coupling means comprises at least one male coupling member extending substantially axially of said components and at least one female coupling member having a socket for said at least one male coupling member, one of said male and female coupling members being provided on said disc and the other of said male and female coupling members being provided on said one disc-shaped portion.

24. The apparatus of claim 19, wherein one of said disc-shaped portions includes means for centering said device.

25. The apparatus of claim 19, wherein said seal extends radially beyond one of said disc-shaped portions and is disposed between said one disc-shaped portion and said one component.

* * * * *